United States Patent [19]

Miller et al.

[11] Patent Number: 4,642,439
[45] Date of Patent: Feb. 10, 1987

[54] METHOD AND APPARATUS FOR EDGE CONTOURING LENSES

[75] Inventors: Richard T. Miller; Yefim P. Sukhman, both of Phoenix; Lynn C. Welker, Scottsdale, all of Ariz.

[73] Assignee: Dow Corning Corporation, Midland, Mich.

[21] Appl. No.: 688,491

[22] Filed: Jan. 3, 1985

[51] Int. Cl.$^4$ .............................................. B23K 26/00
[52] U.S. Cl. ....................... 219/121 LN; 219/121 LG; 219/121 LT; 219/121 LR; 219/121 LP; 264/1.4; 51/284 E
[58] Field of Search ................. 219/121 LG, 121 LC, 219/121 LD, 121 LE, 121 LF, 121 LP, 121 LQ, 121 LN; 428/527; 51/62, 142, 284 R, 284 E; 264/1.4

[56] References Cited

U.S. PATENT DOCUMENTS

| | | | |
|---|---|---|---|
| 3,419,321 | 12/1968 | Barber et al. ...................... | 350/8 |
| 3,750,272 | 8/1973 | Gomond ............................. | 29/558 |
| 3,761,208 | 9/1973 | Boudet et al. ..................... | 425/352 |
| 3,874,124 | 4/1975 | Morgan et al. .................... | 51/125 |
| 3,915,609 | 10/1975 | Robinson ........................... | 425/174.6 |
| 3,948,007 | 4/1976 | Feneberg et al. .................. | 51/284 |
| 3,971,163 | 7/1976 | Trombley et al. ................. | 51/62 |
| 3,972,599 | 8/1976 | Engel et al ........................ | 350/294 |
| 4,275,288 | 6/1981 | Makosch et al. ................... | 219/121 LR |
| 4,307,046 | 12/1981 | Neefe ................................ | 264/1.4 |
| 4,539,463 | 9/1985 | Piccioli et al. .................... | 219/121 LF |

FOREIGN PATENT DOCUMENTS 2546692 10/1978 Fed. Rep. of Germany .
2031793 4/1980 United Kingdom .

OTHER PUBLICATIONS

*Laser Machining and Welding,* N. Rykalin et al., MIR Publishers, Moscow, USSR, Appendix 4, pp. 292–294.

*Primary Examiner*—M. H. Paschall
*Attorney, Agent, or Firm*—Richard E. Rakoczy

[57] ABSTRACT

This invention relates to a method and apparatus for edge contouring and severing a lens such as a contact lens of an elastomeric material such as a silicone elastomer from a workpiece containing the lens. The method most preferably employs two beam focussing means such as laser optics systems situated opposite each other which project a ring-shaped beam of, e.g., 10.6 micron wavelength radiation from a carbon dioxide laser at a workpiece centered between the two beam focussing means. Such a laser beam is preferably directed at both surfaces of a workpiece to fully edge contour and sever a contact lens from the workpiece in a fast and efficient manner.

16 Claims, 7 Drawing Figures

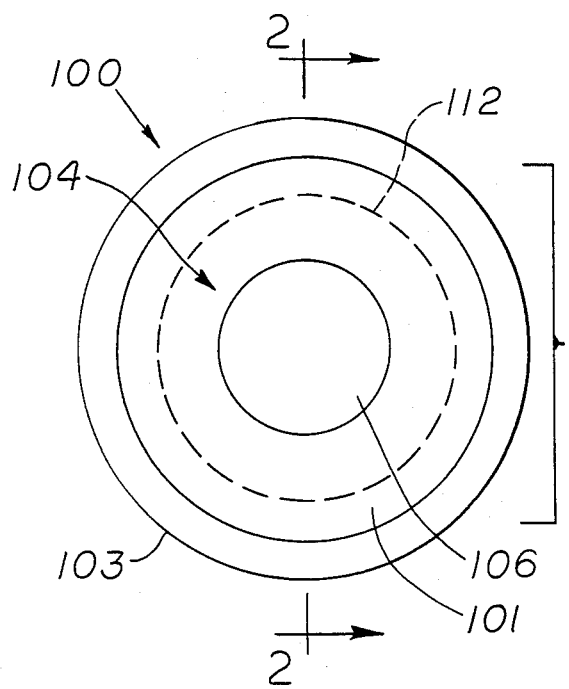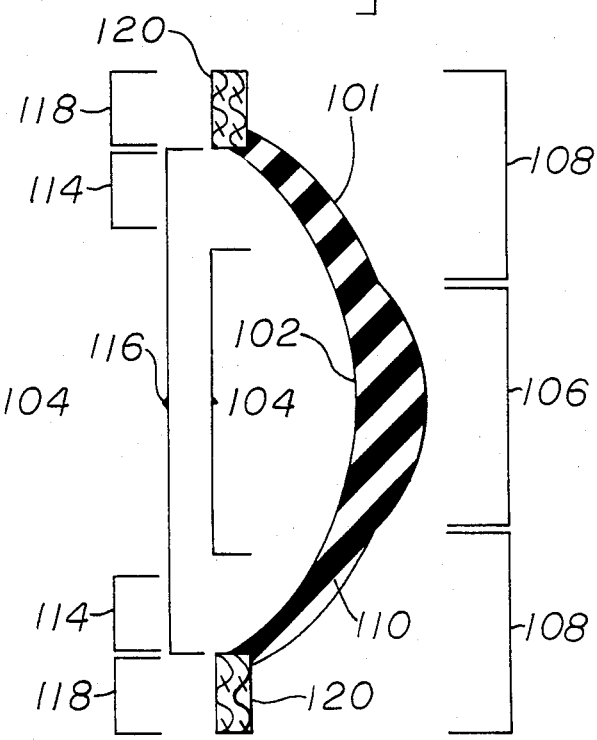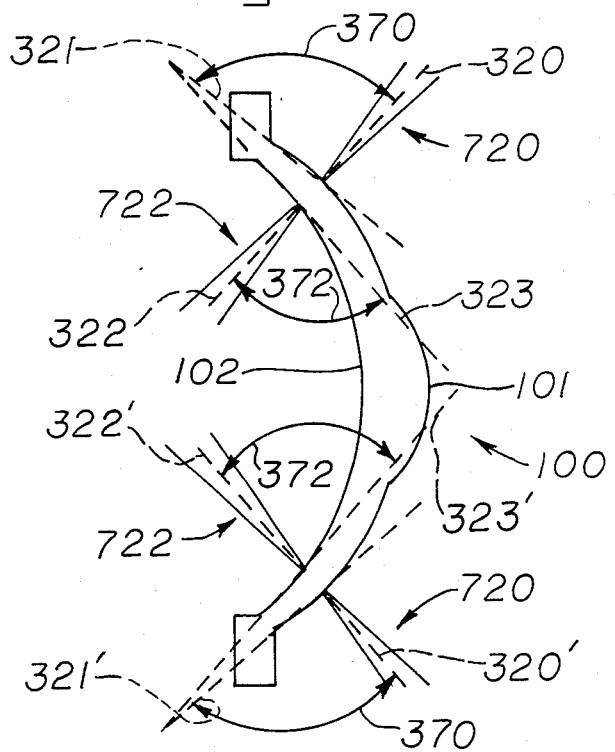

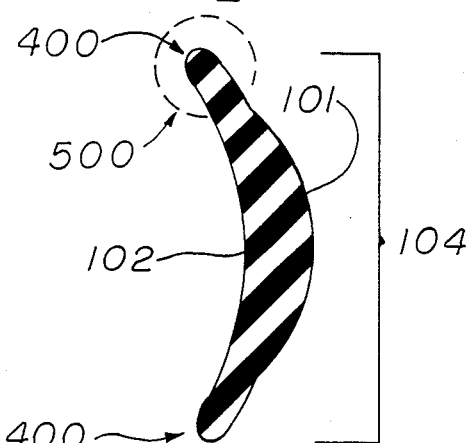
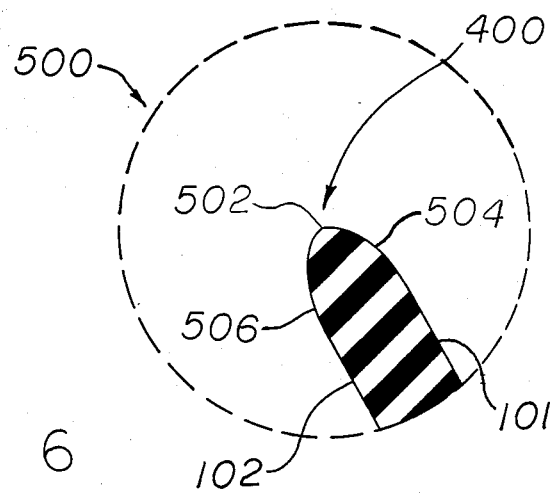
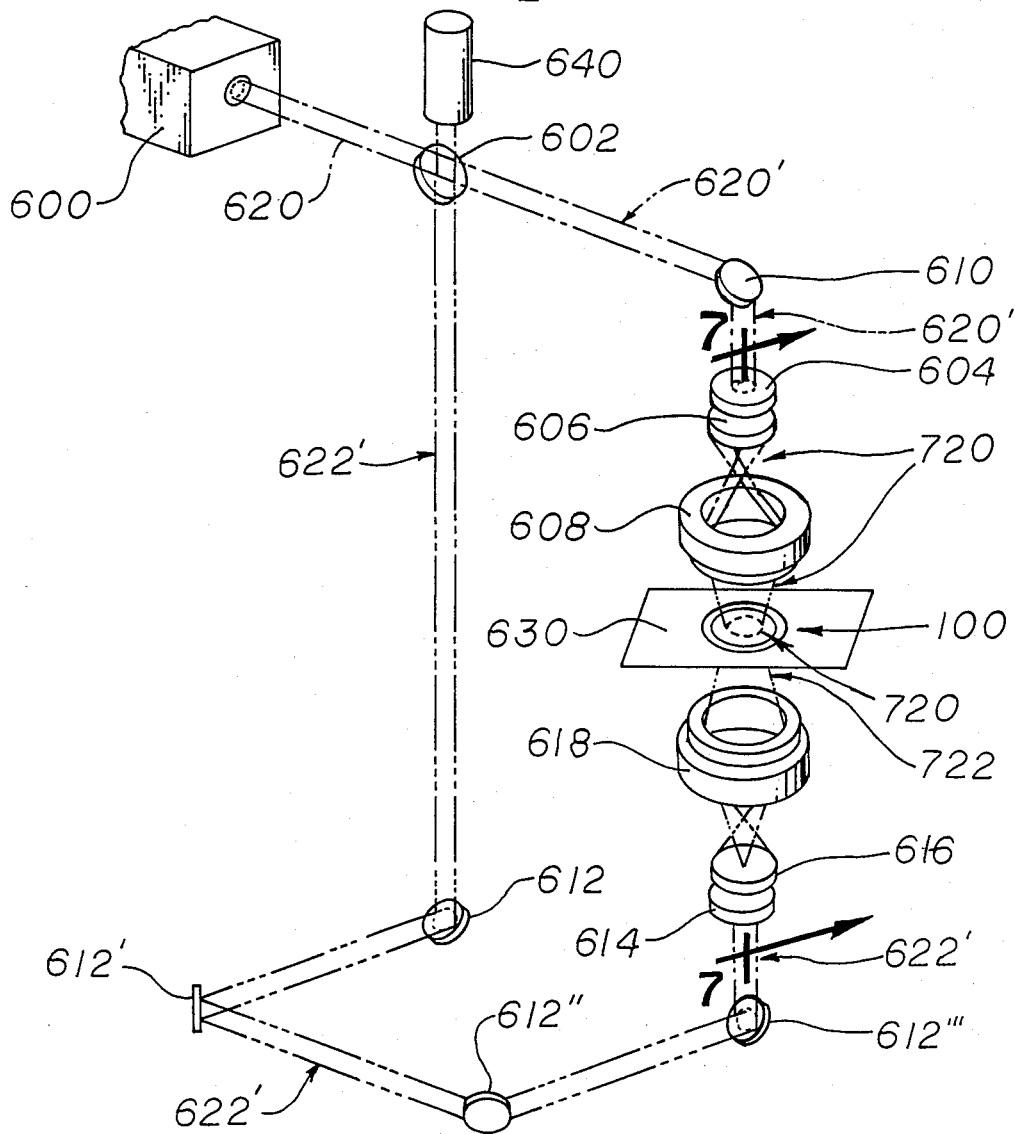

METHOD AND APPARATUS FOR EDGE CONTOURING LENSES

This invention relates to a method of edge contouring lenses of a synthetic, polymeric material, particularly elastomeric eye contact lenses, by directing ring-shaped beams of intense electromagnetic radiation concentrically and preferably at both surfaces of a workpiece containing a lens having a central optical region surrounded by an annular peripheral region for a sufficient length of time to fully edge contour and sever the lens from the workpiece. This invention also relates to the apparatus used to perform that method.

Precision optical devices such as contact lenses, intraocular lenses and optical lenses generally require a specific peripheral edge configuration to enable the lens to be used such as to be worn on the eye or to be fitted into a lens holder. Lenses can be made in a number of ways such as by lathe machining, casting, grinding and molding.

Lenses made from hard lens materials such as synthetic resins like polymethylmethacrylate resin or silicone resin can be further worked or polished after manufacture to create the desired edge contour although such operations tend to be labor intensive and time consuming.

Lenses which are elastomeric at the time at which they are to be edge contoured (i.e., as opposed to lens materials such as sparingly cross-linked poly-2-hydroxyethylmethacrylate polymers which are had and resinous and thus lathe machinable until they are allowed to absorb water and become soft and elastomeric after manufacture is complete) are more difficult to manufacture and are typically made by molding. Molding a properly contoured edge, particularly one with tapered edge contour, presents difficulties since the mold halves must close very tightly to avoid "flash" along the edge which must later be removed (See U.S. Pat No. 3,915,609, Robinson, issued Oct. 28, 1975). Furthermore, molding tools used in such a manner are difficult to manufacture and tend to have short lives when they must be clamped tightly together to reduce flash along the periphery of the lens. In a device which is to be worn on the eye, proper edge contouring is critical because the eye is quite sensitive to imperfections in the eye contact lens. (See U.S. Pat. No. 3,761,208, Boudet, et al., issued Sept. 25, 1973).

Various means have been proposed for edge contour elastomeric contact lenses such as those made of transparent silicone elastomers. For example, methods for edge contouring elastomeric contact lenses have been taught involving passing an abrasive tape (U.S. Pat. No. 3,971,163, Trombley, issued July 27, 1976) or a grinding wheel (U.S. Pat. No. 3,948,007, Feneberg, et al., issued Apr. 6, 1976) over the edge of a rotating contact lens similar to the lathe cutting methods used for hard lens materials. Another prior art method involves freezing a rotating eye contact lens with a cryogenic liquid before abrading to render the lens surface sufficiently hard that the finished eye contact lens has a smoother edge surface than contact lenses which are abraded at room temperature (See U.S. Pat. Nos. 3,750,272, Gromond, issued Aug. 7, 1973 and 3,874,124, Morgan, et al., issued Apr. 1, 1975). The former abrasive tape or grinding wheel method produces elastomeric lenses which have acceptable edge contours, but a finer degree of smoothness is desirable while the latter method required cryogenic liquid equipment and subjects the lens to contact with another source that could contaminate the lens surface. Both methods have the disadvantage of being labor intensive. A method of obtaining a smooth, appropriately contoured peripheral lens edge surface which is fast, is not labor intensive and avoids the need to have to mold the edge contour of the lens appears to be desirable, particularly for the production of eye contact lenses such as those of a silicone elastomer material.

In German Pat. No. 2,546,692 (issued Oct. 19, 1878), Robinson teaches a method of finishing a silicone elastomer contact lens by rotating the lens along its axis for symmetry while a fixed thin beam of laser radiation from a carbon dioxide laser is allowed to contact the edge of the lens in such a manner that first one surface and then the other surface of the peripheral edge of the contact lens is contoured. The intensity of the beam is modulated so that the posterior surface of the lens contains ridge or groove-like indentations permit exchange of tear fluid under the lens. We have found that use of a single fixed thin beam (not modulated to produce grooves) of laster radiation results in a larger indentation in the peripheral edge of a silicone elastomer contact lens at the point where the laser beam first makes contact with the peripheral edge of the lens than around the rest of the lens. As a result, the cut width and edge profile (edge contour) varies. This causes the edged lens to deviate from the desired profile. The method also has the disadvantage that the rotating lens, particularly an elastomer lens, tends to sag as the beam proceeds to cut around the peripheral edge unless it is supported in the middle and that results in lenses which are not perferctly round. A number of center supports having different curvatures are thus needed to properly support the lens in the center to avoid distorting the lens and therefor the edge profile of the contact lens.

U.S. Pat. No. 4,307,046 (issued Dec. 22, 1981) to Neefe teaches use of an infrared laser beam moved on an X and Y axis to shape and polish the convex surface of a contact lens while the lens material is rotated about its axis of symmetry while being supported in a mold which formed the concave surface and lower edge contour. The anterior peripheral contour is formed by the mold.

As will be explained in further detail, infra, our invention involves directing ring-shaped beam of electromagnetic radiation such as a beam of infrared laser radiation at both sides of a workpiece containing a lens to be edge contoured, preferably by causing the beams to simultaneously impinge upon the workpiece to obtain a very smooth, circular lens periphery with the desired edge contour using a minimum of labor intensive effort, particularly where an elastomeric contact lens is to be edge contoured.

Apparatus for generating ring-shaped beams of electromagnetic radiation such as infrared laser radiation are known as can be seen from a review of U.S. Pat. No. 3,419,321 (issued Dec. 31, 1968) to Barber, et al., U.S. Pat. No. 3,972,599 (issued Aug. 3, 1976) to Engel, et al. and U.S. Pat. No. 4,275,288 (issued June 23, 1981) to Mokosch, et al. Such apparatus have been suggested for use in drilling, punching and welding materials. U.S. Pat. No. 3,972,599 (issued Aug. 3, 1976) to Engel, et al. teaches a method for improving the depth of focus of a circular laser beam for use in cutting and welding through the use of substantially cylindrical, tubular, internally reflective axicon. Although these patents teach cutting holes in materials, none of them suggests the method and apparatus for contouring a lens such as a contact lens which will now be more fully described.

SUMMARY OF THE INVENTION

It is one object of this invention to provide a simple, efficient method for edge contouring a lens of a synthetic polymeric material, particularly a contact lens of a cilisone elastomer material.

It is another object of this invention to provide a method of generating edge contoured lenses of different diameters without having to separately mold lenses having the desired contour in different diameters.

It is still a further object of this invention to provide a method of edge contouring a dome-shaped elastomeric lens, particularly an eye contact lens of an elastomeric material, which has a smooth, tapered peripheral edge contour without the necessity of having to mold a lens having a smooth, tapered edge contour.

These and other objects of the present invention are provided by a method which, in its preferred embodiment, comprises (A) positioning a workpiece having an anterior and a posterior surface comprising a lens of a synthetic polymeric material having a central optical region surrounded by an annular peripheral region between a first and second beam focussing means situated opposite each other which means are laser optics systems capable of projecting a ring-shaped beam of electromagnetic radiation having a wavelength in the infrared spectrum and having an appropriate level of energy in the direction of that workpiece such that one ring-shaped beam from each laser optics system strikes the surface of the workpiece at which the beam is directed in such a position and at such an angle relative to each respective surface that a fully contoured peripheral edge can be obtained and thereafter (B) passing a beam of such laser radiation from at least one infrared laser radiation source through each of the laser optics systems for a sufficient period of time to fully edge contour and sever the lens from the workpiece. Preferably, the beam is passed through each laser optics system simultaneously so that both surfaces of the lens are contoured simultaneously.

This invention also relates to the apparatus used to carry out the above method.

BRIEF DESCRIPTION OF THE DRAWINGS

The above and other objects, features and advantages of the present invention will become apparent to those skilled in the art upon an examination of the following description and drawings which are merely illustrative of the present invention. A preferred embodiment of the present invention is illustrated in the accompanying drawings to enable those skilled in the art to better practice the present invention. In the Drawings:

FIG. 1 is a front view of a workpiece 100 containing a contact lens and the ring 112 on which a ring-shaped beam of radiation is to be projected.

FIG. 2 is a cross-sectional view of FIG. 1 taken along section lines 2—2.

FIG. 3 is like FIG. 2, but it additionally shows the position and angles of impingement of the beam of radiation upon surfaces 101 and 102 of workpiece 100.

FIG. 4 shows a fully edged contact lens 104 obtained by the method of the present invention.

FIG. 5 shows a magnified view of one edge of lens 104 of FIG. 4 to further show the tapering contour of the peripheral edge 400, of the contact lens.

FIG. 6 is a schematic representation of the functional elements of the apparatus used to perform the method of this invention.

DETAILED DESCRIPTION OF THE INVENTION

Figure 7:
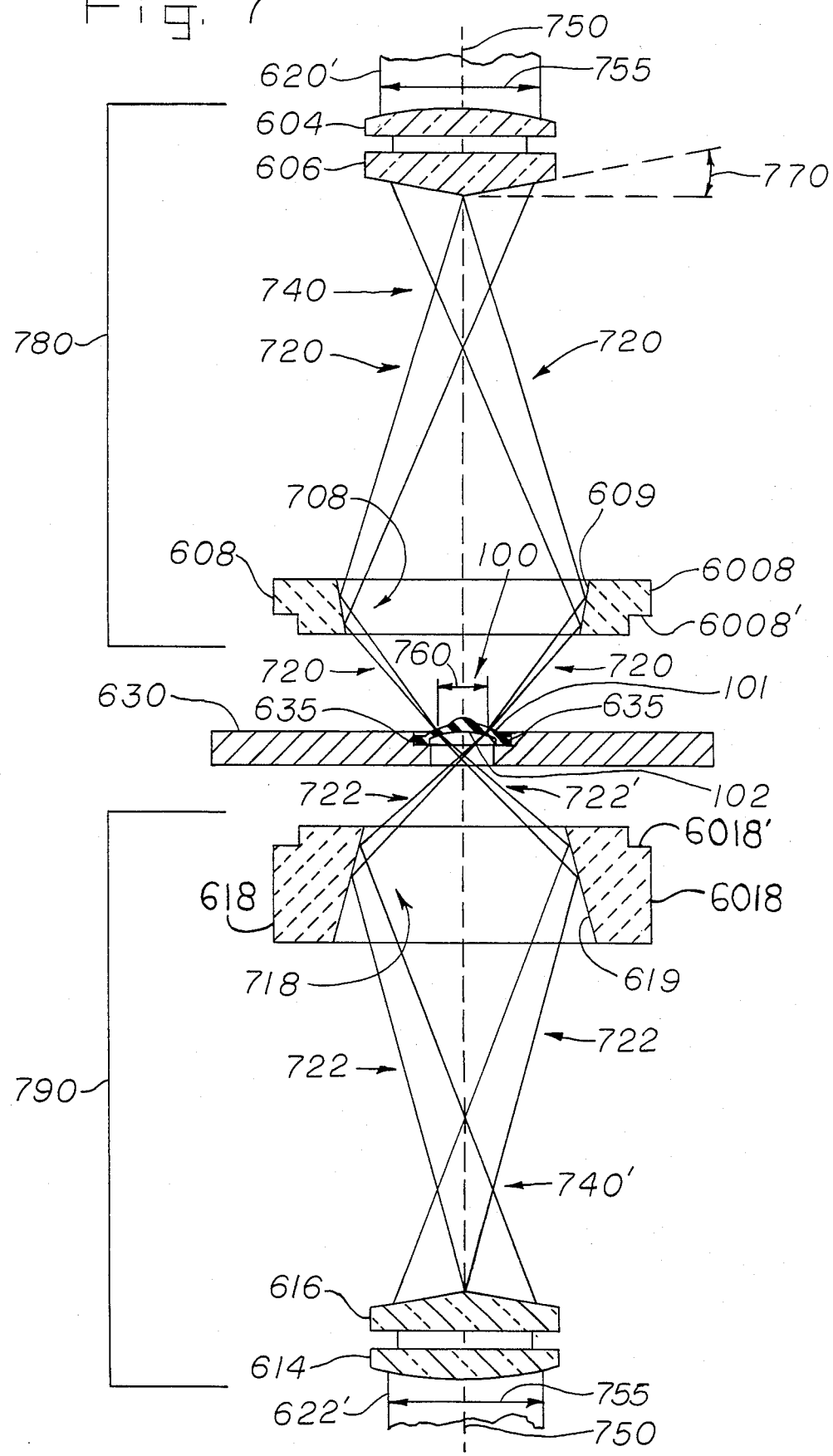
FIG. 7 is a cross-sectional view of FIG. 6 taken along section lines 7—7 showing each of the preferred first and second laser optics systems used to generate ring-shaped beams 720 and 722 of radiation.

Referring to the Drawings, FIGS. 1 and 2 show a workpiece 100 which has an anterior surface 101 and a posterior surface 102 which is a unitary body 103 comprising an eye contact lens 104 which has a central optical region 106 surrounded by an annular peripheral region 108. The term "unitary body" is intended to mean that central optical region 106 is attached to the annular peripheral region 108, preferably by having region 106 and region 108 molded together or otherwise formed as one piece of the same lens material 110 as shown in FIG. 2. Contact lens 104 is defined by ring 112 which marks the position where a ring-shaped beam of radiation 720 will strike the workpiece 100 shown as a dotted line 112 in FIG. 1. As will be described further, infra, one advantage of the method of the present invention is that lenses of various diameters can be cut and edge contoured from workpiece 100 at any point along region 114 by varying the diameter of ring 112 (and thus the ring-shaped beam of radiation 720 and likewise beam 722) which edge contours and severs lens 104 from workpiece 100. For contact lenses, the diameter of ring 112 usually ranges between about 9 and 15 millimeters.

Ring 112 could also be shortened in diameter to overlap and create a lens which only consists of a optical zone; this may be more usefulfor an intraocular or other optical lens which does not require an extended peripheral region 114 which extends over the cornea or sclera of the eye as is commonly used in eye contact lenses.

Contact lens 104, and preferably the entire workpiece 100, is made of well-known transparent synthetic polymeric material of the type commonly used in the manufacture of lenses such as thermoplastic and thermosetting materials such as polymethylmethacrylate, and other copolymers of vinyl-functional organic monomers, polycarbonate, silicone resin, silicone-organic acrylate copolymers, cellulose acetate butyrate, silicone elastomers, poly-hydroxyacrylate polymers, telechelic perfluorinated polyethers, copolymers of alpha-olefins and sulfur dioxide and the like. dimensionally stable materials such as hard resinous materials can be edge contoured and polished to a smooth surface much more easily than elastomeric materials such as silicone elastomers, therefore the method of the present invention is of greater advantage when lenses of elastomeric materials such as eye contact lenses or intraocular lenses which are otherwise difficult to edge contour smoothly are to be edge contoured. The method of the present invention is also advantageous with lenses of hard materials because the amount of labor involved in edging can be reduced.

Workpiece 100 can be made so as to be no larger than the diameter indicated by region 116 of FIG. 2 which consists of central optical region 106 and peripheral region 114. A workpiece of the diameter of region 116 can be molded with blunt edge (not shown) and thereafter edge contoured and severed from the remainder of the peripheral region 114 using the method of the present invention. The blunt edge of the peripheral region 114 can be used to center the workpiece 100 between the laser optics systems so the ring-shaped beam is concentric with the contact lens to be edge contoured. FIG. 2 shows the details of a more preferred embodiment of a workpiece of an elastomeric material for use in the present invention wherein the peripheral region 108 consists of region 114 which is further surrounded by an annular peripheral haptic 118 which can be made of the same material as the remainder of the workpiece 100 and, in the embodiment shown, workpiece 100 is molded as a unitary body and comprises a circular fiber washer 120. As shown in FIG. 2, workpiece 100 has a dome shape and can be of an elastomeric material such as a silicone elastomer wherein fiber washer 120 forming haptic 118 rigidifies the dome shaped molding and enable one to easily center the lens between the laser optics systems 780 and 790 by inserting it in a holder 630 which is adapted to receive the workpiece 100 as shown in FIGS. 6 and 7.

FIG. 3 shows in greater detail than in FIGS. 6 and 7 the impingement of ring shaped beam 720 on anterior surface 101 and of ring-shaped beam 722 on posterior surface 102 of workpiece 100. Dotted lines 320 and 320' represent the center of beam 720 as it impinges upon surface 101 at an angle 370 relative to tangents 321 and 321' to surface 101. Likewise, dotted lines 322 and 322' represent the center of beam 722 as it impinges upon surface 102 at an angle 322 relative to tangents 323 and 323' to surface 102. Preferably, angles 370 and 372 are each substantially 90° and the focal point of each of beams 720 and 722 are at the surfaces 101 and 102 to completely sever the contact lens 104 from the center of workpiece 100. The remainder of peripheral region 108 is thus left behind to obtain contact lens 104 as shown in FIG. 4 which has a fully contoured edge 400.

Edge 400 is more fully shown in FIG. 5 as magnified section 500. Referring to FIG. 5, the impingement of beam 720 on surface 101 has contoured the edge of surface 101 such that it begins to taper at point 504 towards apex point 502 which is located approximately intermediate between surfaces 101 and 102. Likewise, the impingement of ring-shaped beam 722 on surface 102 has contoured the edge of surface 102 such that it begins to taper at point 506 towards apex point 502.

FIGS. 4 and 5 show the preferred edge contour which is such that the contoured peripheral edge of the lens is relatively symmetrical. By altering angle 370 and/or angle 372, one can change the edge contour and the location of point 502. For example, increasing angle 370 to greater than 90° while angle 372 remains the same will result in a peripheral edge contour where the curved surface in the area of point 504 will be less tapered than the curved surface in the area of point 560, provided that beam 722 has a sufficient level of energy to enable the lens to be severed from workpiece 100. Thus, non-symmetrical peripheral edge contours can be obtained using the method of the present invention.

Having described the manner in which the method of the present invention acts upon the workpiece 100 to produce a fully edge contoured lens, the apparatus used in and manner of carrying out the method of the present invention will now be described more fully with reference to FIGS. 6 and 7.

FIG. 6 is a schematic representation of the functional elements used in a preferred embodiment the apparatus of the present invention. A number of different electromagnetic radiation sources such as electron beam sources, X-ray sources or laser sources such as those generating beams having a wavelength in the ultraviolet, visible light or infrared spectrum and systems of beam focussing means which are designed to focus radiation beams of a specific wavelength emanating from such sources are available. Useful radiation sources and focussing means will be apparent to those skilled in the art after a review of this specification and drawings and upon consideration of the nature of the lens material which is to be contoured and severed from the workiece 100. For example, see "Electrothermal Cutting Processings Using a $CO_2$ Laser" by J. E. Harry, et al., in IEEE Transactions On Industry Applications, Vol 1A-8, No. 4, July/August 1972 for considerations affecting the choice of laser relative to the material to be contoured. For Example, the aforementioned Barber, et al., Makosch, et at. and Engel, et al. patents teach methods of generating circular beams of radiation. For the purposes of this invention, we prefer the beam focussing system shown in FIGS. 6 and 7 which is more fully described in U.S. patent application Ser. No. 06 688,664 to Richard A. Buchroeder, Eric M. Palmer and Yefim P. Sukhman entitled "Ring of Light Laser Optics System" which is filed concurrently herewith and is assigned to the same assignee as is the present invention. The laser optics systems 780 and 790 shown in FIGS. 6 and 7 are quite advantageous where thermoset materials such as silicone elastomers are to be contoured because such materials require a relatively high powered radiation source such as a gas laser having a beam of radiation with a wavelength such as 10.6 microns which is in the infrared spectrum. Furthermore, the optics systems employed are simple and, for use with high powered lasers, the configuration minimizes the possibility of having high concentrations of energy within a lens element that could cause the lens element to heat up excessively and to possibly shatter. Points 740 and 740' in FIG. 7 illustrate an area where the beams cross and where heat buildup could occur if a lens were located at that point. The Buchroeder, et al. optics system 780 and 790 also has the advantage of being able to project a ring-shaped beam of radiation at a dome-shaped workpiece at an angle relative to the surface of the workpiece which is perpendicular to a tangent to that surface as will be described in more detail, infra. The Barber, et al. patent is more useful for cutting a flat surface which is perpendicular to the central optical axis of the optics system because the ring-shaped beam emerges from the Barber, et al. optics system substantially parallel to the central optical axis of that optics system.

Referring to FIG. 6, the preferred embodiment of the apparatus for carrying out the method of the present invention will now be described. In FIG. 6, an electromagnetic radiation generating source shown as laser source 600 is shown generating a circular beam 620 of electromagnetic radiation. The beam 620 must have a sufficient level of energy and be sufficiently reactive with the lens material to contour the desired lens material after being transformed into a ring-shaped beam by a complementary beam focussing means, but should not be allowed to impinge on the lens surface for an excessive amount of time to avoid charring or other lens material degradation. Laser sources producing such beams of radiation in the ultraviolet, visible or infrared spectrum may find the most use in the method of the present invention provided that the beam focussing means contains refractive or reflective elements which can focus the beam from the laser into a ring-shaped beam. In the presently preferred embodiment, a laser source generating a beam having a wavelength in the infrared spectrum is used, and more preferably, a laser source employing carbon dioxide gas as the lasing medium is used to produce a beam with a wavelength of 10.6 microns. It is believed that when a single carbon dioxide laser source having a nominal power output of about 1500 watts using a beam splitter as shown in FIGS. 6 and 7 is used to contour a workpiece containing a silicone elastomer contact lens with a peripheral region having a thickness of about 0.090–0.011 mm (0.0035–0.0045 inches), a single pulse in the 4–7 millisecond range with an energy of 10 joules on each surface of the workpiece to be contoured should be sufficient to contour and sever such a contact lens with no more than about a 5 millisecond pulse duration presently being preferred to avoid charring of the lens material when using a carbon dioxide laser. Since the ring-shaped beam covers a larger area than a thin circular laser beam, the energy concentration at any one point is reduced relative to that of a thin circular beam and high powered laser sources are needed to obtain a sufficient level of energy at the surface for contouring and severing the lens from the workpiece. Use of excessive pulse time can result in charring of the edge of the lens. The type of laser, beam quality, power, pulse width and shape of the pulse is matched to the material to be contoured and severed in a manner which will be apparent to those skilled in the art.

If desired, two separate laser sources of smaller nominal power can be used wherein no beam splitter is used and the beam focussing means for contouring the anterior surface of the workpiece is coupled directly to one laser source and the beam focussing means for contouring the posterior surface of the workpiece is coupled to the second laser source.

In either case, for some materials it may be possible to contour one surface of the workpiece followed by contouring of the other surface such as by firing one laser source followed by the other or by using a tiltable mirror to first direct the beam from the laser to one beam focussing means and then to the other. For materials such as elastomers which may tend to sag after the first surface is contoured and, in general, it is preferred that both surfaces of the workpiece be contoured simultaneously to obtain optimum peripheral roundness and edge contouring.

In a less preferred embodiment which does not possess all of the above-identified advantages of a method employing two opposed beam focussing means, this invention also comprises a method for final edge contouring and severing a lens of a polymeric material, preferably a dome-shaped lens which can be a contact lens, from a workpiece using only a single beam focussing means of the above-described type wherein the lens surface opposite that being contacted by the beam is fully formed from center to peripheral edge and the beam is employed to contour the edge of the lens surface upon which it impinges and severs the lens from the workpiece.

Various types of laser, particularly carbon dioxide lasers of relatively high power are commercially available from PRC, In., 2652 S. Main Street, Genesaw, Ga. 30144, Spectra-Physics, In., 3333 N. First Street, San Jose, Calif. 95134, and Photon Sources, Inc., 12165 Globe Road Livonia, Mich. 48150 and other laser manufacturers.

As is well known to those skilled in the art, the diameter of the laser beam entering the beam focussing means should be fairly uniform so that the ring-shaped beam contours the lens fairly uniformly. As is well known, a conventional spatial filter (not shown) can be placed within the path of the laser beam to make the beam more uniform in cross-sectional power density at some loss in power at the lens surface.

Referring to FIGS. 6 and 7, circular laser beam 620 emerges from carbon dioxide laser source 600 after being passed through a conventional beam expander/collimator within source 600 such that the beam 620 strikes beam splitter 602 which is a double plano disk which can be made of an optical grade of zinc selenide having an antireflective coating for 10.6 microns at 45° incidence on one side of the beam splitter 601 and a dielectric coating which is 50% reflective and 50% transmissive for 10.6 microns at 45° incidence on the opposite side. In the single laser beam source 600 configuration shown, circular beam 620 is split by beam splitter 602 into two beams 620' and 622' which each have one half of the energy of the original beam 620.

Beam 620' is directed at mirror 610 by beam splitter 602 and is reflected to the upper beam focussing means in the form of laser optics system 780 which consists of refractive focussing element 604, a refractive ring-forming element in the form of axicon 606 and internally reflective cone 608. As is shown more clearly in FIG. 7, beam 620' passes through refractive focussing element 604 which is used to focus the ring-shaped beam 720 on surface 101 of workpiece 100. Axicon 606 is used to transform circular beam 620' into a ring-shaped beam 720, the focal point of which is adjusted by means of element 604. After beam 720 emerges from axicon 606, reflective cone 608 is used to adjust the diameter 760 of beam 720 impinging upon surface 101 of workpiece 100. The angle of reflective surface 609 of cone 608 relative to central optical axis 750 determines the angle 370 at which beam 720 strikes surface 101 thereby enabling one to contour a variety of dome-shaped workpiece having anterior and posterior surfaces of different radii of curvature by substituting cones with reflective surface angles designed to suit the lens to be contoured.

The lower beam focussing system shown as laser optics system 790 is composed of elements of the same type as the upper beam focussing means. Thus, circular beam 622' is reflected from beam splitter 602 consecutively to mirrors 612, 612', 612" and 612''' such that beam 622' passes into refractive focussing element 614 and axicon 616 emerges as ring-shaped beam 722 which is projected at internally reflective cone 618 which alters the diameter and angle of beam 722 relative to surface 102 such that beam 722 impinges upon surfce 102 of workpiece 100 at the desired diameter and angle 372 for contouring and severing the lens contained in workpiece 100.

Workpiece 100 is positioned between the upper and lower laser optics systems 780 and 790 by placing it in a holder 630 having a recess 635 with an open central portion which is adapted to receive workpiece 100 in such a manner that the central optical axis 750 passes through the center of central optical region 106 of workpiece 100.

In accordance with well known procedures, all elements of the beam focussing means are positioned and aligned so as to be concentric with central optical axis 750 as shown in FIG. 7 so that the center of each ring-shaped beam 720 and 722 produced lies on axis 750.

Each mirror and lens element is mounted in accordance with well known procedures in such a manner as to permit the elements to be moved from side to side perpendicular to axis 750 or up and down along axis 750 to achieve optimum alignment.

Focussing elements 604 and 614 are each mounted so as to be movable parallel to axis 750 to permit focussing of the ring-shaped beams during operation of the apparatus. Optionally, axicons 606 and 616 can be moved in such a direction, but it is more desirable that axicons 606 and 616 be fixed. Cones 608 and 618 are also mounted to permit motion parallel to axis 750 to enable the diameter of each of ring-shaped beams 720 and 722 to be varied to suit the type of lens to be contoured.

To obtain flexibility in achieving proper concentricity of beam 720 with beam 722, it can be desirable to mount elements 610, 604, 606 and 608 in a fixed fashion and to mount elements 612''', 614, 616 and 618 together on a base which can be moved transversely relative to axis 750 passing through the fixed elements of vice-versa. In this manner, each set of elements is moved relative to the other to achieve optimum alignment of both sets of elements along axis 750. Alignment can be accomplished by performing a gross manual alignment and thereafter finer adjustments in alignment and beam focus can be made by directing a beam from the laser source 600 at a workpiece and observing the edge contour obtained. Alternatively, the beam from a low power laser source such as a helium-neon visible laser 640 can be used to visually align the elements followed by test contouring a workpiece to obtain fine adjustment of the alignment and beam focus. Preferably, the alignment is done with a low powered laser of the same type as the source laser 600 since the focue differs somewhat for differing wavelengths of radiation.

After alignment, the apparatus of FIGS. 6 and 7 can be used to edge contour and sever a lens such as a contact lens from workpiece 100. Edge contouring and severing can be accomplished simultaneously by sending beam 620 into beam splitter 602 such that ring-shaped beams 720 and 722 impinge upon surfaces 101 and 102, respectively, at the same time. For example, a thin plate with an aperture which is large enough to permit beam 722 to pass through the aperture, but small enough in diameter to prevent the severed lens from falling through the aperture can be attached to holder 630 on the side facing cone 618.

The area around holder 630 is purged and maintained under an inert cover gas such a helium for the purpose of reducing the possibility of lens surface charring. It is also preferred that a stream of inert gas (perferably the same gas as the cover gas) such as helium be continuously passed over the interior of both reflective cones toward the workpiece so that varporized lens material is carried away from the optical elements to reduce the need for cleaning such elements.

Alternatively, a tiltable mirror can be installed at the point where beam splitter 602 is located to enable one to direct beam 620 first to one beam focussing means and then tilted to enable the beam to enter the other beam focussing means. Obviously, a laser beam 620 having a sufficient power to contour both surfaces of workpiece 100 simultaneously would have to be reduced in intensity by about one half if one wished to contour one surface at a time. When the method of this invention is practiced in this manner, one has the advantage that the workpiece 100 does not have to be moved or turned to accomplish contouring of the opposite side and that reduces the chances that one side will be contoured off-center relative to the other side.

The following beam focussing elements were used to produce an apparatus of the type shown in FIGS. 6 and 7 for use in edge contouring a silicone elastomer contact lens having a nominal diameter of 11.3 mm using a Spectra-Physics Model 810 fast axial flow carbon dioxide laser having a nominal power output of about 600 watts and contained a 2X beam expander to produce a 10.6 micron wavelength circular beam having a diameter of 1 inch. This was less than the optimum 1.5 inch diameter (38.1 mm) beam diameter [diameter 755 in FIG. 7 is 1.5 inches (38.1 mm) for which the laser optics system used (and described, infra) was designed. A 6.0 microsecond gated pulse (650 watts peak power) delivered from the laser source through the upper beam focussing means of FIG. 6 to the upper surface of the workpiece was observed to make a circular cut to a depth of 0.0045 inches (0.114 mm) and the anterior peripheral lens surface of the workpiece was observed to have a crisp curl-over (contour) all around the peripheral edge of the anterior lens surfce.

The lenses used in the above testing were designed to receive a 1.5 inch (38.1 mm) diameter laser beam and were as follows:

Refractive focussing elements 604 and 614 were both 50.80 mm +0, −0.25 in diameter having a 5.08 mm ±0.10 center thickness which were plano on the side facing the workpiece and convex on the opposite side with the convex lens face having a radius of curvature of 318.5 mm ±0.5 with a clear aperture of 43.18 mm for each lens surface. The lens material was optical grade zinc selenide and each lens surface was antireflective coated for 10.6 micron wavelength radiation at normal incidence assuming a power density of about 300 watts/cm.

Each axicon 606 and 616 was made of optical grade zinc selenide, had a diameter of 50.800 mm +0, −0.025 with a center thickness of 10.66 mm ±0.50, a plano back surface and a conical front surface where angle 770 in FIG. 7 was 10°.5566±0.033. The conical surface straightness was 2 fringes point to point (i.e., the difference or peak to peak variation between a test plate surface and the conical surface expressed in number of fringes or half-wavelengths of radiation) on any meridian with a clear aperture for each lens surface of 43.18 mm. The plano side was antireflective coated for 10.6 micron radiation at normal incidence and the conical side was antireflective coated for 10.6 microns radiation at 30°±5° angle of incidence assuming a power density of about 400 watts/cm.

Cone 608 was manufactured of fused silica having a maximum outer diamter of 101.60 mm +0, −0.025 and a thickness of 22.00 mm ±0.1. The internal reflective surface 609 had a clear aperture extending from 1 mm from the edge of the cone facing the workpiece to 2 mm from the opposite end of the cone. Cone 608 had a inner diameter of 69.37 mm ±0.10 on the side facing away from the workpiece. The angle of the conical interior reflective surface 609 relative to axis 750 was 10°.000±0.033.

Cone 618 was also manufactured of a fused silica having the same outer diameter as cone 608 with a thickness of 28.0 mm ±0.1. Internal reflective surface 619 had a clear aperture which extended 3 mm from each edge had diameter of 71.0 mm ±0.2 on the side facing away from the workpiece and the angle of the conical interior reflective surface 619 relative to axis 750 was 15°.000±0.033. The cone straightness was 4 fringes peak to peak along every meridian. The central axis of each cone 608 and 618 is centered and parallel with the outside peripheral surface 6008 and 6018 respectively within ±0.025 mm and that central axis is perpendicular to surface 6008' and 6018' to within ±0.1 mm to facilitate accurate mounting of the cone. The reflectivity at 10.6 micron wavelength radiation at a 60° angle of incidence assuming a power density of about 600 watts/cm. The reflective coating used on the ocnical reflective surface was a chromium gold coating.

While the above method and apparatus have been described with reference to contact lenses, the invention also has applicability to edge contouring other types of lenses such as intraocular lenses or camera lenses. Other modifications and variations of the method and apparatus of the present invention will become apparent to those skilled in the art from an examination of the above specification and drawings. Therefore, other variations of the present invention may be made which fall within the scope of the appended claims even though such variations were not specifically discussed above.

That which is claimed is:

1. A method of fully contouring the peripheral edge of a lens comprising the steps of:
    (A) positioning a workpiece having an anterior and a posterior surface between a first and a second beam focussing means situated opposite each other wherein each of said beam focussing means is capable of projecting a ring-shaped beam of electromagnetic radiation in the direction of said workpiece surfaces such that one ring-shaped beam from each of said beam focussing means inpinges upon the surface of said workpiece at which the beam is directed in such a position and at such an angle relative to each respective surface that a lens of a preselected diameter having a fully contoured peripheral edge can be obtained, said workpiece being a unitary body comprising a lens made of a synthetic polymeric material having a central optical region surrounded by an annular peripheral region, and thereafter
    (B) passing a beam of electromagnetic radiation from at least one electromagnetic radiation source thorugh each of sadi first and second beam focussing means for a sufficient period of time to allow said ring-shaped beams of electromagnetic radiation projected from said beam focussing means to impinge upon and fully edge contour and sever said lens from the workpiece, said beam having an appropriate wavelength for the material from which the lens is made and having a sufficient level of energy to accomplish said contouring and severing after passing through said beam focussing means.

2. The method as claimed in claim 1 wherein said beam is passed simultaneously through each of said beam focussing means to fully edge contour both lens surfaces simultaneously.

3. The method as claimed in claim 1 wherein said lens is an eye contact lens.

4. The methods as claimed in claim 3 wherein said contact lens is made of a material which is elastomeric when it is being contoured and said beam is passed simultaneously through each of said beam focussing means to fully edge contour both surfaces of contact lens.

5. The method as claimed in claim 4 wherein the contact lens is made of a silicone elastoner.

6. The method as claimed in claim 4 wherein each of said circular beams is slightly aberrated to produce a rounded edge contour.

7. The method as claimed in claim 1 wherein said beam is a beam of laser radiation having a wavelength in the infrared radiation spectrum.

8. The method as claimed in claim 4 wherein said beam is a beam of laser radiation having a wavelength in the infrared spectrum.

9. The method as claimed in claim 3 wherein the workpiece has a dome shape and said ring-shaped beams impinge upon each lens surface at an angle which is substantially perpendicular to the surface being impinged upon by said beam.

10. The method as claimed in claim 9 wherein said contact lens is made of a material which is elastomeric when it is being edge contoured and said beam is passed simultaneously through each of said beam focussing means to fully edge contour said contact lens from both surfaces simultaneously.

11. The method as claimed in claim 10 wherein said beam is a beam of laser radiation having a wavelength in the infrared radiation spectrum.

12. The method as claimed in claim 1 wherein said lens is made of a material which is elastomeric when it is being edge-contoured.

13. The method as claimed in claim 1 wherein said beam is beam of laser radiation having a wavelength in the visible light spectrum.

14. The method as claimed in claim 1 wherein said beam is a beam of laser radiation having a wavelength in the ultraviolet spectrum.

15. A method of contouring the peripheral edge of a lens comprising the steps of:
    (A) positioning a workpiece having an anterior and a posterior surface beneath a beam focussing means wherein the beam focussing means is capable of projecting a ring-shaped beam of electromagnetic radiation in the direction of one of said workpiece surfaces such that one ring-shaped beam from the beam focussing means impinges upon the surface of said workpiece at which the beam is directed in such a position and at such an angle relative to that surface that a lens of a preselected diameter having a fully contoured peripheral edge can be obtained, said workpiece being a unitary body comprising a lens made of a synthetic polymeric material having a central optical region surrounded by an annular peripheral region and wherein the surface opposite the surface upon which said beam impinges has a configuration which permits said beam to form a fully edge contoured lens, and thereafter
    (B) passing a beam of electromagnetic radiation from an electromagnetic radiation source through said beam focussing means for a sufficient period of time to allow a ring-shaped beam of electromagnetic radiation projected from said beam focussing means to impinge upon, edge contour and sever said lens from the workpiece, said beam having an appropriate wavelength for the material from which the lens is made and having a sufficient level of energy to accomplish said contouring and severing after passing through said beam focussing means.

16. The method as claimed in claim 15 wherein the workpiece has a dome shape and said ring-shaped beam impinges upon the lens surface at an angle which is substantially perpendicular to the surface being impinged upon by said beam.

* * * * *